United States Patent
Blanchard

(10) Patent No.: US 12,280,840 B2
(45) Date of Patent: Apr. 22, 2025

(54) GROUSER TRACTION CLEAT THAT CINCHES ONTO RUBBER CONTINUOUS TRACKS

(71) Applicant: John Paul Blanchard, Blanchard, ID (US)

(72) Inventor: John Paul Blanchard, Blanchard, ID (US)

( * ) Notice: Subject to any disclaimer, the term of this patent is extended or adjusted under 35 U.S.C. 154(b) by 463 days.

(21) Appl. No.: 17/736,732

(22) Filed: May 4, 2022

(65) Prior Publication Data

US 2022/0258817 A1 Aug. 18, 2022

Related U.S. Application Data

(63) Continuation-in-part of application No. 17/094,352, filed on Nov. 10, 2020, now abandoned.

(60) Provisional application No. 62/935,786, filed on Nov. 15, 2019.

(51) Int. Cl.
   *B62D 55/28* (2006.01)
(52) U.S. Cl.
   CPC .................. *B62D 55/286* (2013.01)
(58) Field of Classification Search
   CPC ...... B62D 55/26; B62D 55/28; B62D 55/283; B62D 55/286
   See application file for complete search history.

(56) References Cited

U.S. PATENT DOCUMENTS

| 2,967,737 | A | * | 1/1961 | Moore | B62D 55/275 301/44.3 |
| 5,033,801 | A | * | 7/1991 | Beeley | B62D 55/202 305/180 |
| 8,424,981 | B1 | * | 4/2013 | Stratton, Jr. | B62D 55/286 305/191 |
| 2004/0140717 | A1 | * | 7/2004 | McNutt | B62D 55/286 305/187 |
| 2018/0319450 | A1 | * | 11/2018 | Wilson | B60C 27/20 |

* cited by examiner

*Primary Examiner* — S. Joseph Morano
*Assistant Examiner* — Emily G. Castonguay

(57) ABSTRACT

A grouser traction cleat that cinches onto vehicle tracks is presented. The grouser traction cleat apparatus comprises a first mounting plate, a second mounting plate, an adjustment element, and a cleat insert. The first mounting plate comprises a plurality of adjustment guides. The second mounting plate comprises a plurality of guide slots. The plurality of adjustment guides is distributed about the first adjustment plate. The plurality of adjustment slots is distributed about the second adjustment plate. The plurality of adjustment guides is slidably connected along the plurality of adjustment slots. The first mounting plate and the second mounting plate are operatively connected to each other along the adjustment element. The cleat insert is connected along the first mounting plate, opposite to the second mounting plate.

9 Claims, 3 Drawing Sheets

GROUSER TRACTION CLEAT THAT CINCHES ONTO RUBBER CONTINUOUS TRACKS

FIELD OF THE INVENTION

Generally, the present disclosure relates to the field of wheel substitutes for land vehicles. More specifically, the present disclosure relates to methods, apparatuses, and devices for providing traction to a tracked vehicle.

BACKGROUND OF THE INVENTION

Weather events such as rain, snow, and ice dramatically affect the stopping distance of a vehicle. The driver's capability to complete a smooth and safe stop is severely limited due to reduced track plate traction. In order to stop safely, the vehicle's continuous rubber tracks must maintain traction by maintaining a contact with the road surface while rolling. When handling slippery winter roads, the keys to safety are slower speeds, and gentler stops and turns. Currently, there are a number of attempts for solutions to increase the traction of rubber-tracked construction vehicles. Some of these solutions attempt to amalgamate with the OEM rubber tracks with permanent or semi-permanent devices that are not only cumbersome and laborious to rapidly place on and off, but these solutions fail to meet the needs of the industry because using such devices potentially destroy the OEM rubber track, thus the integrity of the steel belts within them. In addition, storing seasonal rubber tracks that weigh upwards of 400 pounds, are cumbersome to move due to their size and mass, create challenges in itself. Other solutions attempt to remedy the issue with drilled in or self-tapping studs for icy surfaces, but these solutions are unable to meet the needs of the industry because they may not accommodate the variables with different terrain surfaces, give the ability to ascend or descend grades and the heads easily shear off with turning on rough surfaces. Still, other solutions seek to recommend winter rubber tracks, but these solutions also fail to meet industry needs because they are extremely costly, laborious to install and uninstall, cumbersome to store, and again do not meet all the needs for multiple surface conditions with the flexibility to rapidly change them when the conditions necessitate it.

Existing techniques for providing traction to a tracked vehicle are deficient with regard to several aspects. For instance, current technologies do not provide an easy and efficient way to increase traction between a track of a vehicle and a road surface. Furthermore, current technologies do not provide a traction device which may be easily stored and readily accessible. Therefore, there is a need for improved methods, apparatuses, and devices for providing traction to a tracked vehicle that may overcome one or more of the above-mentioned problems and/or limitations.

SUMMARY OF THE INVENTION

The present invention is a grouser traction cleat apparatus that removably attaches along any suitable vehicle track. The grouser traction cleat apparatus comprises a first mounting plate, a second mounting plate, an adjustment element, and a cleat insert. The first mounting plate comprises a cleat receiver, a first adjustment plate, and a plurality of adjustment guides. The second mounting plate comprises a fastening plate, a second adjustment plate, and a plurality of guide slots. The cleat receiver is connected adjacent to the first adjustment plate. The plurality of adjustment guides is distributed about the first adjustment plate. The fastening plate is connected adjacent to the second adjustment plate. The plurality of adjustment slots is distributed about the second adjustment plate. The plurality of adjustment guides is slidably connected along the plurality of adjustment slots. The first mounting plate and the second mounting plate are operatively connected to each other along the adjustment element, where the adjustment element is configured to adjust the first mounting plate from the second mounting plate to form a specified adjustment distance between the first mounting plate and the second mounting plate. The cleat insert is connected along the cleat receiver, opposite to the second mounting plate.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
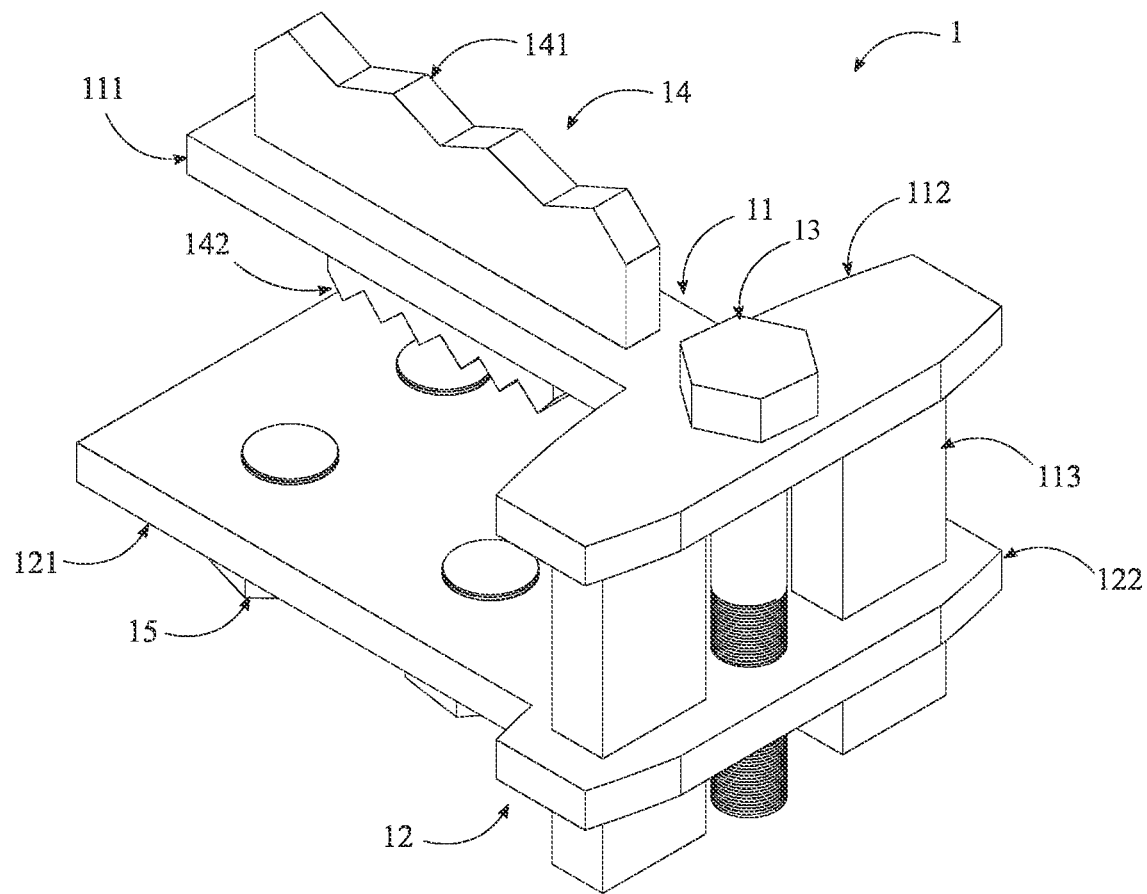
FIG. 1 is a top perspective view of the present invention.
Figure 2:
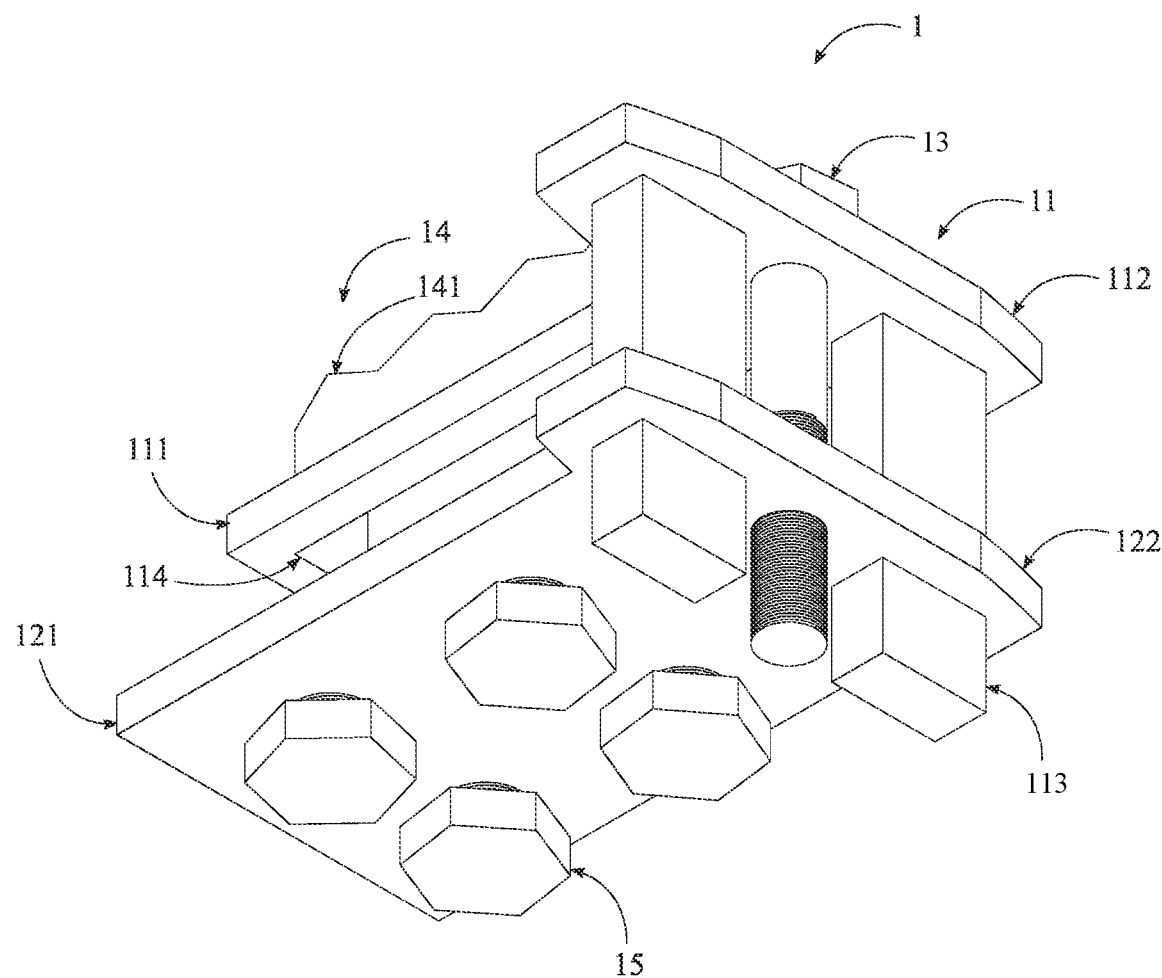
FIG. 2 is a bottom perspective view of the present invention.
Figure 3:
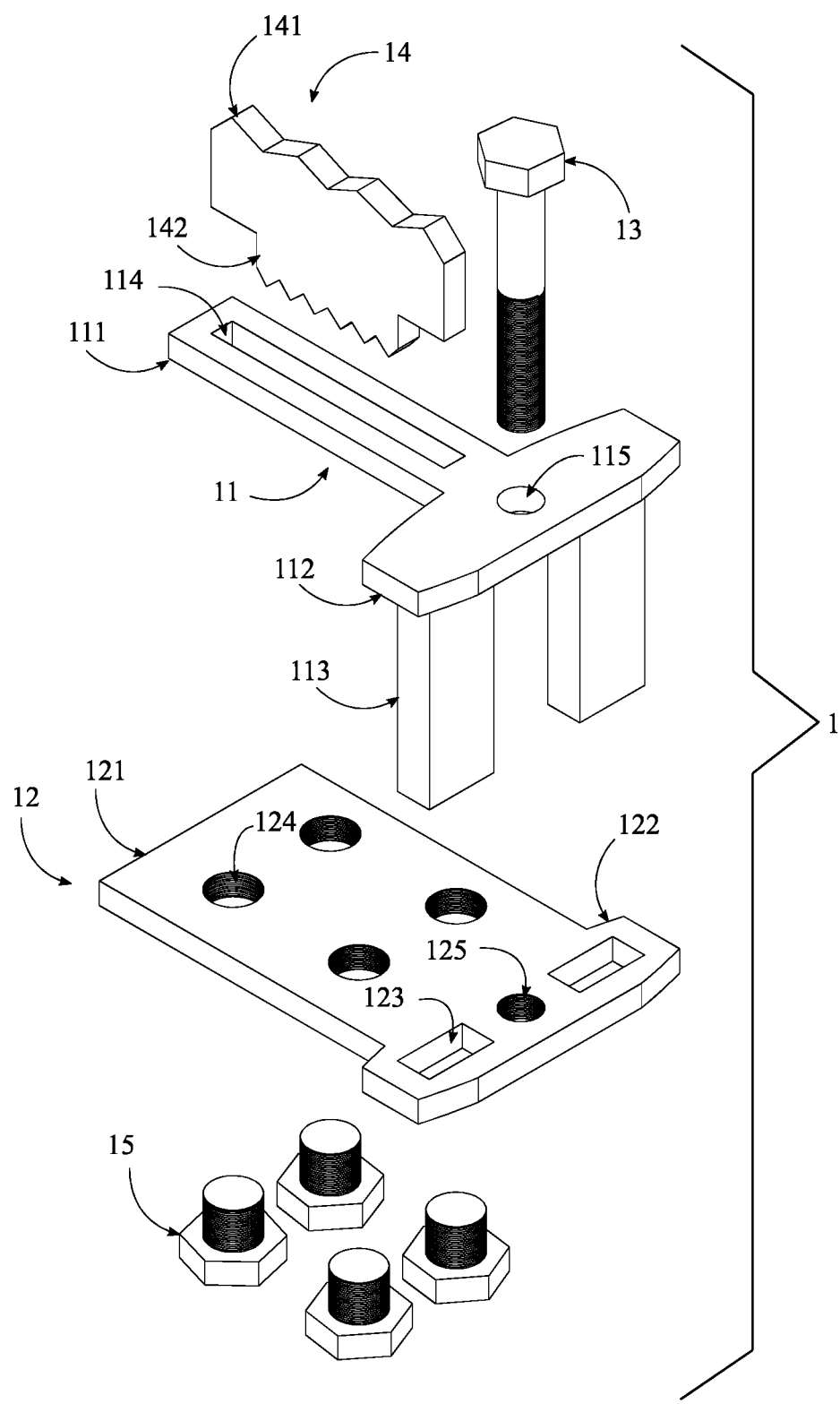
FIG. 3 is an exploded view of the present invention.

In reference to FIGS. 1-3, the present invention is a grouser traction cleat apparatus 1 that removably attaches along any suitable vehicle track. The grouser traction cleat apparatus 1 comprises a first mounting plate 11, a second mounting plate 12, an adjustment element 13, and a cleat insert 14. The first mounting plate 11 comprises a cleat receiver 111, a first adjustment plate 112, and a plurality of adjustment guides 113. The second mounting plate 12 comprises a fastening plate 121, a second adjustment plate 122, and a plurality of guide slots 123. The cleat receiver 111 is connected adjacent to the first adjustment plate 112. The plurality of adjustment guides 113 is distributed about the first adjustment plate 112. The fastening plate 121 is connected adjacent to the second adjustment plate 122. The plurality of adjustment slots is distributed about the second adjustment plate 122. The plurality of adjustment guides 113 is slidably connected along the plurality of adjustment slots. The first mounting plate 11 and the second mounting plate 12 are operatively connected to each other along the adjustment element 13, where the adjustment element 13 is configured to adjust the first mounting plate 11 from the second mounting plate 12 to form a specified adjustment distance between the first mounting plate 11 and the second mounting plate 12. The cleat insert 14 is connected along the cleat receiver 111, opposite to the second mounting plate 12. In the preferred embodiment, the grouser traction cleat apparatus 1 specifically attaches along rubber vehicle tracks, such that the first mounting plate 11 and the second mounting plate 12 sufficient cinches and secures along the rubber vehicle track. In the preferred embodiment, the grouser traction cleat apparatus 1 is made out of any suitable and durable material such as, but not limited to steel or any other suitable material. In the preferred embodiment, the grouser traction cleat apparatus 1 is scaled to any size to fit any suitable vehicle track.

In the preferred embodiment, the first mounting plate 11 takes the form of any suitable mounting member that secures along one side of the vehicle track. In the preferred embodiment, the first mounting plate 11 mounts along the exterior side of the vehicle track. In the preferred embodiment, the second mounting plate 12 takes the form of any suitable mounting member that secures along the internal side of the vehicle track, opposite from the first mounting plate 11. In the preferred embodiment, the adjustment element 13 takes the form of any suitable adjustment implement, such as, but not limited to bolt adjustment members, or any other suitable adjustment member that adjustably connects the first mounting plate 11 to the second mounting plate 12 together, such that the grouser traction cleat apparatus 1 can adjust the first mounting plate 11 from the second mounting plate 12 to form a specified adjustment distance between the first mounting plate 11 and the second mounting plate 12. More specifically, the specified adjustment distance is dependent on the vehicle track thickness that the first mounting plate 11 and the second mounting plate 12 are mounting along. In the preferred embodiment, the cleat insert 14 takes the form of any suitable traction member that serves as the main traction element 141 of the grouser traction apparatus. Additionally, the cleat insert 14 also serves as the main grasping element 142 that aids in cinching and securing the first mounting plate 11 along the external side of the vehicle track. In various embodiments, the cleat insert 14 takes the form of various traction cleat shapes or profiles suitable for various applications.

In the preferred embodiment, the cleat receiver 111 serves as the main connection site of the first mounting plate 11 in orienting and attaching the cleat insert 14 along the external side of the vehicle track. In the preferred embodiment, the first adjustment plate 112 supports the attachment and engagement of the adjustment element 13 along the first mounting plate 11. In the preferred embodiment, the plurality of guides takes the form of extruded guide blocks projecting from the first adjustment plate 112, where the plurality of guides is configured to slidably connect along the plurality of guide slots 123 of the second mounting plate 12. More specifically, the plurality of guides serves as structural implements that slidably reinforces and connects the first mounting plate 11 to the second mounting plate 12.

In the preferred embodiment, the fastening plate 121 of the second mounting plate 12 serves as the main connection site of the second mounting plate 12 in orienting and attaching the second mounting plate 12 along the internal side of the vehicle track. In the preferred embodiment, the second adjustment plate 122 supports the attachment and engagement of the adjustment element 13 along the second mounting plate 12. In the preferred embodiment, the plurality of guide slots 123 takes the form of slider slots that slidably connects along the plurality of adjustment guides 113.

In the preferred embodiment, the cleat insert 14 comprises a traction element 141. The traction element 141 is terminally connected along the cleat receiver 111, opposite to the second mounting plate 12. The cleat insert 14 further comprises a grasping element 142. The grasping element 142 is terminally connected along the cleat receiver 111, opposite to the traction element 141. In the preferred embodiment, the traction element 141 takes the form of the primary traction and cleat implement that project externally from the first mounting plate 11. More specifically, the traction element 141 provides traction to the grouser traction cleat apparatus 1 attached along the vehicle tracks. In the preferred embodiment, the grasping element 142 takes the form of any suitable grasping element 142 that allows the cleat insert 14 to engage along the external side of the vehicle track. This secures the first mounting plate 11 along the external side of the vehicle track.

In the preferred embodiment, the grouser traction cleat apparatus 1 further comprises a plurality of fastening elements 15. The plurality of fastening elements 15 is distributed about the fastening plate 121, where the plurality of fastening elements 15 is configured to adjust the fastening plate 121 in a loose configuration or a tightened configuration. The second mounting plate 12 comprises a plurality of fastening apertures 124. The plurality of fastening apertures 124 is distributed about the fastening plate 121. The plurality of fastening elements 15 is operatively connected to the plurality of fastening apertures 124, where the plurality of fastening elements 15 is configured to adjust the fastening plate 121 in a loose configuration or a tightened configuration. In the preferred embodiment, the plurality of fastening elements 15 takes the form of any suitable fastening implement in securing and grasping the second mounting plate 12 along the internal side of the vehicle track. In the preferred embodiment, the plurality of fastening elements 15 is a plurality of bolt fasteners. In this embodiment, the plurality of bolt fasteners threads along the plurality of fastening apertures 124, where the plurality of bolt fasteners is configured to loosen and tighten along the plurality of fastening apertures 124 in order to further grasp or secure the second mounting plate 12 along the internal side of the vehicle track.

In the preferred embodiment, the first mounting plate 11 further comprises a mounting slot 114. The mounting slot 114 traverses through the cleat receiver 111. The cleat insert 14 is connected along the mounting slot 114. In the preferred embodiment, the mounting slot 114 takes the form of an attachment slot that allows the cleat insert 14 to install along the cleat receiver 111. The cleat insert 14 is then attached along the mounting slot 114 through any suitable fastening means, such as, but not limited to welding, or any other suitable fastening means.

The first mounting plate 11 comprises a mounting aperture 115. The second mounting plate 12 comprises an adjustment aperture 125. The mounting aperture 115 traverses through the first adjustment plate 112. The adjustment aperture 125 traverses through the second adjustment plate 122. The adjustment aperture 125 and the mounting aperture 115 is operatively connected to each other through the adjustment element 13, where the adjustment aperture 125 and the mounting aperture 115 are configured to adjust the first mounting plate 11 from the second mounting plate 12 to form the specified adjustment distance between the first mounting plate 11 and the second mounting plate 12. In the preferred embodiment, the adjustment element 13 is an adjustment bolt that installs along the mounting aperture 115 of the first mounting plate 11 and the adjustment aperture 125 of the second mounting plate 12. The adjustment bolt threads along the adjustment aperture 125 such that the adjustment bolt may lengthen or shorten the specified adjustment distance.

Although the invention has been explained in relation to its preferred embodiment, it is to be understood that many other possible modifications and variations can be made without departing from the spirit and scope of the invention as hereinafter claimed.

What is claimed is:

1. A grouser traction cleat apparatus comprising:
   a first mounting plate;
   a second mounting plate;
   an adjustment element;
   a cleat insert;
   the first mounting plate comprising a cleat receiver, a first adjustment plate, a plurality of adjustment guides, and a first mounting surface;
   the second mounting plate comprising a fastening plate, a second adjustment plate, and a plurality of guide slots;
   the cleat receiver being connected adjacent to the first adjustment plate;
   the plurality of adjustment guides being distributed about the first adjustment plate;
   the fastening plate being connected adjacent to the second adjustment plate;
   the plurality of adjustment slots being distributed about the second adjustment plate;
   the plurality of adjustment guides being slidably connected along the plurality of adjustment slots;
   the first mounting plate and the second mounting plate being operatively connected to each other along the adjustment element, wherein the adjustment element is configured to adjust the first mounting plate from the second mounting plate to form a specified adjustment distance between the first mounting plate and the second mounting plate; and
   the cleat insert being connected along the cleat receiver, opposite to the second mounting plate.

2. The grouser traction cleat apparatus as claimed in claim 1 comprising:
   the cleat insert comprising a traction element; and
   the traction element being terminally connected along the cleat receiver, opposite to the second mounting plate.

3. The grouser traction cleat apparatus as claimed in claim 2 comprising:
   the cleat insert comprising a grasping element; and
   the grasping element being terminally connected along the cleat receiver, opposite to the traction element.

4. The grouser traction cleat apparatus as claimed in claim 1 comprising:
   a plurality of fastening elements; and
   the plurality of fastening elements being distributed about the fastening plate, wherein the plurality of fastening elements is configured to adjust the fastening plate in a loose configuration or a tightened configuration.

5. The grouser traction cleat apparatus as claimed in claim 4 comprising:
   the second mounting plate comprising a plurality of fastening apertures;
   the plurality of fastening apertures being distributed about the fastening plate; and
   the plurality of fastening elements being operatively connected to the plurality of fastening apertures, wherein the plurality of fastening elements is configured to adjust the fastening plate in a loose configuration or a tightened configuration.

6. The grouser traction cleat apparatus as claimed in claim 5, wherein the plurality of fastening elements is a plurality of bolt fasteners.

7. The grouser traction cleat apparatus as claimed in claim 1 comprising:
   the first mounting plate comprising a mounting slot;
   the mounting slot traversing through the cleat receiver; and
   the cleat insert being connected along the mounting slot.

8. The grouser traction cleat apparatus as claimed in claim 1 comprising:
   the first mounting plate comprising a mounting aperture;
   the second mounting plate comprising an adjustment aperture;
   the mounting aperture traversing through the first adjustment plate;
   the adjustment aperture traversing through the second adjustment plate; and
   the adjustment aperture and the mounting aperture being operatively connected to each other through the adjustment element, wherein the adjustment aperture and the mounting aperture are configured to adjust the first mounting plate from the second mounting plate to form the specified adjustment distance between the first mounting plate and the second mounting plate.

9. The grouser traction cleat apparatus as claimed in claim 8, wherein the adjustment element is an adjustment bolt.

* * * * *